United States Patent
Li et al.

(10) Patent No.: US 8,588,255 B2
(45) Date of Patent: Nov. 19, 2013

(54) FULL-T CROSS APPARATUS AND METHOD

(75) Inventors: Lei Li, Shenzhen (CN); Yujie Chen, Shenzhen (CN); Jinfeng Wu, Shenzhen (CN); Zhangwei Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 13/009,522

(22) Filed: Jan. 19, 2011

(65) Prior Publication Data

US 2011/0116517 A1 May 19, 2011

(30) Foreign Application Priority Data

Jan. 19, 2010 (CN) .......................... 2010 1 0001640

(51) Int. Cl.
*H04L 12/54* (2013.01)

(52) U.S. Cl.
USPC .......................................................... 370/498

(58) Field of Classification Search
USPC .......................... 370/498, 375–376, 391, 535
See application file for complete search history.

(56) References Cited

U.S. PATENT DOCUMENTS

| | | | |
|---|---|---|---|
| 6,445,705 B1 * | 9/2002 | Holden et al. | 370/412 |
| 6,870,838 B2 * | 3/2005 | Dally | 370/369 |
| 7,301,958 B2 * | 11/2007 | Borkowski et al. | 370/442 |
| 7,583,664 B2 * | 9/2009 | Ho et al. | 370/386 |
| 7,773,608 B2 * | 8/2010 | Miles et al. | 370/400 |
| 2003/0112831 A1 * | 6/2003 | Williams | 370/535 |
| 2006/0209899 A1 * | 9/2006 | Cucchi et al. | 370/498 |
| 2006/0268939 A1 * | 11/2006 | Dries et al. | 370/498 |
| 2008/0056259 A1 * | 3/2008 | Miyamoto | 370/391 |
| 2009/0180472 A1 * | 7/2009 | Lometti et al. | 370/389 |

FOREIGN PATENT DOCUMENTS

| | | |
|---|---|---|
| CN | 1141568 A | 1/1997 |
| CN | 1248878 A | 3/2000 |
| CN | 1297296 A | 5/2001 |
| CN | 101789840 B | 6/2013 |

* cited by examiner

*Primary Examiner* — Charles C Jiang
*Assistant Examiner* — Amy Ling
(74) *Attorney, Agent, or Firm* — Brinks Gilson & Lione

(57) ABSTRACT

A full-T cross apparatus and method are provided. The full-T cross apparatus includes an input module, which includes multiple input channels; and multiple output modules, each of which includes an output channel, an output control module, and multiple data storage modules. Each of the multiple data storage modules is corresponding to each of the multiple input channels of the input module. The multiple output modules are configured to receive service data from the multiple input channels according to the output channels corresponding to the service data, and send the service data according to output time slots corresponding to the service data. In this way, the chip size is reduced to some extent, and further, the costs and power consumption of the chip are reduced.

8 Claims, 4 Drawing Sheets

FULL-T CROSS APPARATUS AND METHOD

CROSS-REFERENCE TO RELATED APPLICATION

This application claims priority to Chinese Patent Application No. 201010001640.6, filed on Jan. 19, 2010, which is hereby incorporated by reference in its entirety.

FIELD OF THE INVENTION

The present invention relates to the field of communications, and in particular, to a full-T cross apparatus and method.

BACKGROUND OF THE INVENTION

A full-T cross is a time-slot level cross, which refers to that, as for a multi-channel and multi-slot interleaving input service, a cross device can cross service data of the input service of any channel and any time slot to any channel and any time slot of an output service without blocking. For example, as for a Synchronous Digital Hierarchy (SDH) application, the structure of a Synchronous Transport Module (STM)-1 frame is a frame of 9 lines and 270 columns, while the structure of an STM-N frame is interleaved by N STM-1 frames according to time slots (byte interleave herein).

During the conception the present invention, the inventor finds that the prior art has at least the following drawbacks: At present, the two dominant methods for implementing the full-T cross are respectively: using a Random Access Memory (RAM) to implement the full-T cross, which directly leads to the expansion of the chip size due to increasing demand for on-chip RAM; and using a Multiplexer (MUX) to implement the full-T cross, which brings great difficulty to the layout and wiring at the back end of the chip due to excessive MUXs and interconnection lines, and eventually leads to the expansion of the chip size as well. It can be seen that, with the improvement of the capacity of the current full-T cross chip, the size of the chip is also increasing, which directly leads to the increase in the costs and power consumption of the chip.

SUMMARY OF THE INVENTION

An embodiment of the present invention provides a full-T cross apparatus and method, which reduce the chip size to some extent.

In one aspect, an embodiment of the present invention provides a full-T cross apparatus, where the apparatus includes an input module, which includes multiple input channels and multiple output modules, each of the multiple output modules includes an output channel, an output control module, and multiple data storage modules. Each of the multiple data storage modules is corresponding to each of the multiple input channels of the input module. The multiple output modules are configured to receive service data from the multiple input channels according to the output channels corresponding to the service data, and send the service data according to output time slots corresponding to the service data.

In another aspect, an embodiment of the present invention provides a full-T cross method, where the method includes: buffering data, from input channels and to be crossed to output channels; writing the data of an input channel number corresponding to each input time-slot number from the buffered data into a location of a corresponding output time-slot number for re-buffering according to a preset corresponding relation between the input channel numbers and the output time-slot numbers; and outputting the re-buffered data.

The above technical solutions have the following beneficial effect: The technical means of time-slot cross is implemented by using the multiple output modules to realize channel cross and reading the service data in each output module according to the output time slots and the input channels of the service data, thus achieving the technical effects of reducing the chip size to some extent and further reducing the costs and power consumption of the chip.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
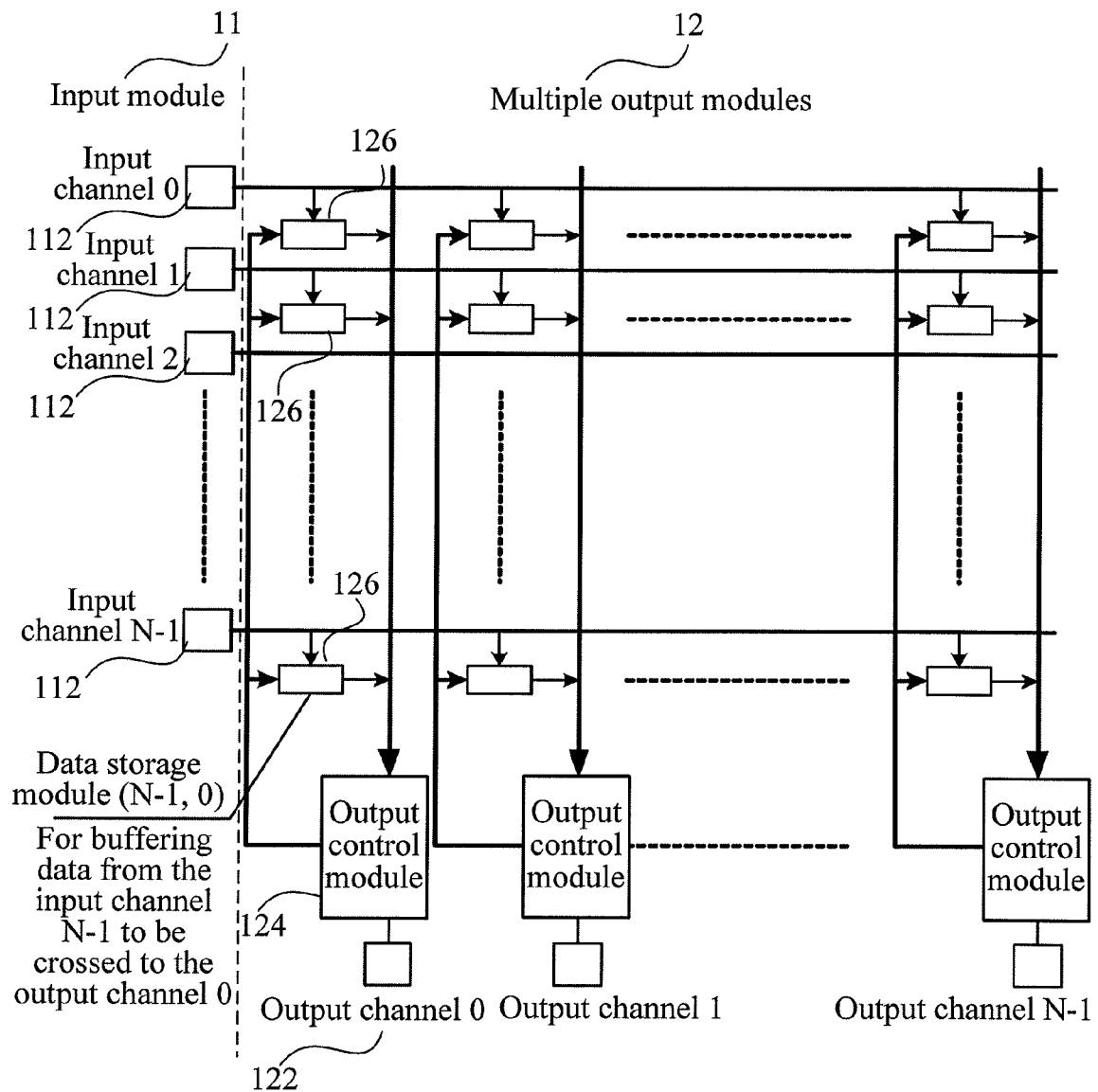
FIG. 1 is a schematic view of a full-T cross apparatus according to an embodiment of the present invention.

As shown in FIG. 1, an embodiment of the present invention provides a full-T cross apparatus 10. The full-T cross apparatus 10 includes an input module 11, and multiple output modules 12. The input module 11 includes multiple input channels 112. In the embodiment of the present invention, each of the output modules 12 includes an output channel 122, an output control module 124, and multiple data storage modules 126. Each of the multiple data storage modules 126 is corresponding to each of the multiple input channels 112 of the input module 11.

The multiple output modules 12 are configured to receive service data from the multiple input channels 112 according to the output channels corresponding to the service data, and send the service data according to output time slots corresponding to the service data.

In the embodiment of the present invention, the data storage module 126 receives service data from the corresponding input channel 112. Further, in the embodiment of the present invention, a First In First Out data buffer (FIFO) may be adopted in the data storage module 126, and the output module 12 saves the service data sequentially according to the input time slots of the service data for the convenience of read.

The output control module 124 saves address information and output time-slot information of the service data received by the output module 12. The address information includes storage addresses of the service data in the multiple data storage modules 126. The output control module 124 sends, in each time slot, the service data in the multiple data storage modules 126 to the output channel 122 of the output module 12 according to the output time-slot information and the address information of the service data. In the embodiment of the present invention, the address information and the output time-slot information may be set by a user through a configuration unit, or may be information sent along with the service data and saved by the output control module 124.

The storage addresses of the service data in the multiple data storage modules may include input channel numbers, and the output time-slot information may include output time-slot numbers. Each of the data storage modules 126 buffers the data, from the input channels and to be crossed to the output channels, according to a preset storage control table; and the storage control table is generated according to a cross configuration table of each output channel in configuration information of a Control Memory (CM) of the full-T cross. The output control module 124 further sends, in each time slot, the service data in the multiple data storage modules to the output channel of each output module according to a preset corresponding relation, between the input channel numbers and the output time-slot numbers, saved in an arbitration selection table; and the arbitration selection table is generated according to the cross configuration table of each output channel in the configuration information of the CM of the full-T cross, or generated according to the storage control table and the cross configuration table of each output channel in the configuration information of the CM of the full-T cross.

In the full-T cross apparatus according to the embodiment of the present invention, time-slot cross is implemented by using the multiple output modules to realize channel cross and reading the service data in each output module internally according to the output time slots and the input channels of the service data, thus reducing the chip size to some extent, and further reducing the costs and power consumption of the chip.

Embodiment 2

Figure 2:
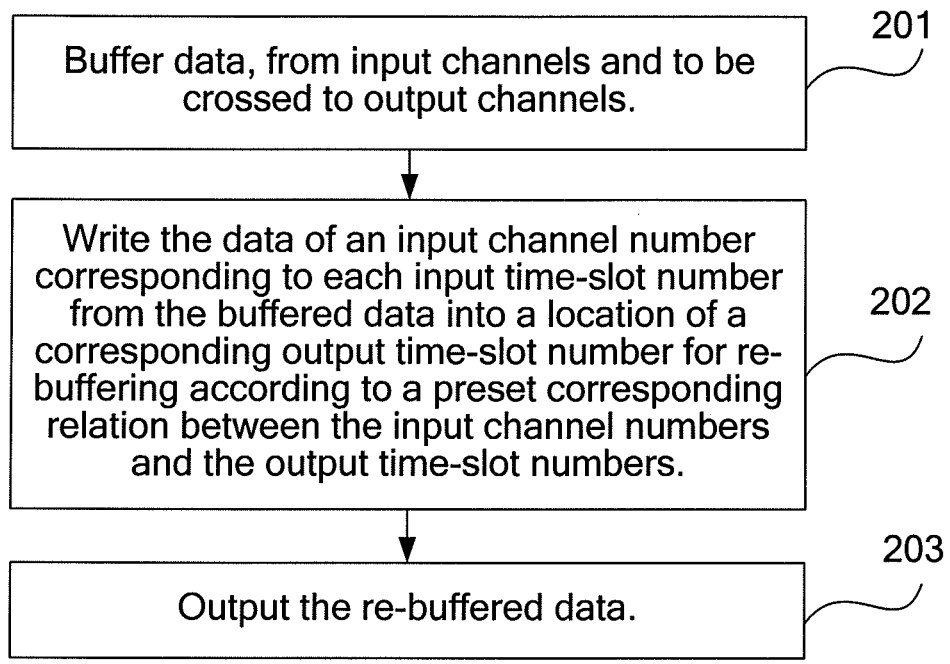
FIG. 2 is a flow chart of a full-T cross method according to an embodiment of the present invention.

FIG. 2 is a flow chart of a full-T cross method according to an embodiment of the present invention, where the method includes the following steps.

Step 201: Data, from input channels and to be crossed to output channels, is buffered.

Optionally, the data, from the input channels and to be crossed to the output channels, may be buffered according to a preset storage control table; and the above storage control table may be generated according to a cross configuration table of each output channel in configuration information of a CM of the above full-T cross. The buffering the data, from the input channels and to be crossed to the output channels, may include: buffering the data, from the input channels and to be crossed to the output channels, by using a FIFO.

Step 202: The data of an input channel number corresponding to each input time-slot number in the buffered data is written into a location of a corresponding output time-slot number for re-buffering according to a preset corresponding relation between the input channel numbers and the output time-slot numbers.

Optionally, the corresponding relation between the input channel numbers and the output time-slot numbers may be saved in an arbitration selection table; and the arbitration selection table may be generated according to the cross configuration table of each output channel in the configuration information of the CM of the above full-T cross, or generated according to the storage control table and the cross configuration table of each output channel in the configuration information of the CM of the full-T cross.

Optionally, the writing the data of the input channel number corresponding to each input time-slot number in the buffered data into the location of the corresponding output time-slot number for re-buffering according to the preset corresponding relation between the input channel numbers and the output time-slot numbers may include: writing the data of the input channel number corresponding to each input time-slot number in the buffered data into the location of the corresponding output time-slot number for re-buffering according to the preset corresponding relation between the input channel numbers and the output time-slot numbers by using an MUX; or writing the data of the input channel number corresponding to each input time-slot number in the buffered data into the location of the corresponding output time-slot number for re-buffering according to the preset corresponding relation between the input channel numbers and the output time-slot numbers by using an internal bus.

Optionally, the writing the data of the input channel corresponding to each input time-slot number into the location of the corresponding output time-slot number for re-buffering may include: writing the data of the input channel number corresponding to each input time-slot number into the location of the corresponding output time-slot number for re-buffering through a ping-pong buffer.

Step 203: The re-buffered data is output.

In the above technical solution according to the embodiment of the present invention, the following technical means is adopted: buffering the data, from the input channels and to be crossed to the output channels; writing the data of the input channel number corresponding to each input time-slot number in the buffered data into the location of the corresponding output time-slot number for re-buffering according to the preset corresponding relation between the input channel numbers and the output time-slot numbers; and outputting the re-buffered data. In this way, the technical effects of reducing the chip size to some extent are achieved and the costs and power consumption of the chip are further reduced.

Embodiment 3

Assume that when the solution of the present invention is applied in an SDH application field, similar to what is shown in FIG. 1, an input service has N input channels in total, and each input channel has data of M time slots to be crossed. Then, N*M data storage modules are provided in this solution, forming a cross-connection matrix, and each data storage module is capable of buffering data. For example, for a data storage module (i,j), the buffered data is the data that is crossed from an input channel i to an output channel j. For the output channel j, the cross of the output channel j may be accomplished by respectively reading the buffered data from the N data storage modules (0,j) to (N−1,j) and outputting the data after buffering.

Figure 3:
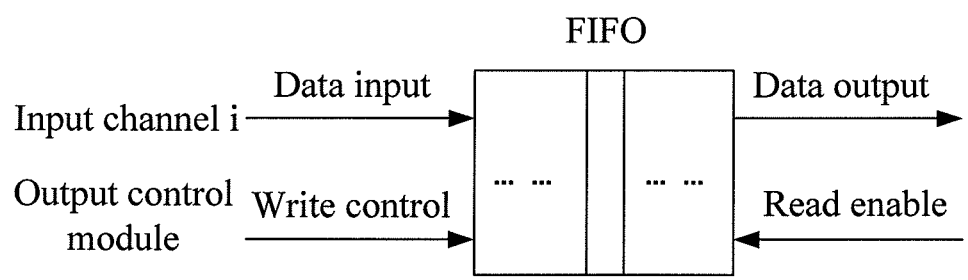
FIG. 3 is a schematic view of an internal buffer of a data storage module according to an embodiment of the present invention.

FIG. 3 is a schematic view of an internal buffer of a data storage module according to an embodiment of the present invention. As shown in FIG. 3, the data storage module (i, j) is taken as an example to illustrate the method for implementing each data storage module. For the data storage module (i, j), actually an FIFO with a small depth buffers the data of the input channel i into the FIFO according to control information provided by an output control module. It should be noted that, since the output control module can obtain empty/full information of the FIFO in each data storage module, and is designed to ensure that the FIFO will not be written to full or read to empty. Therefore, the design of the FIFO is preferred to be as simple as possible, so as to save resources.

The output control module is comparatively complicated. The output control module should first generate a storage control table (as shown in Table 2) according to a cross configuration table (as shown in Table 1) of the output channel j in configuration information of a CM.

TABLE 1

Cross Configuration Table of Output Channel j

| Output Time-Slot Number | Input Channel Number | Input Time-Slot Number |
|---|---|---|
| 0 | 5 | 0 |
| 1 | 3 | 5 |
| 2 | 6 | 2 |
| ... | ... | ... |
| 5 | 2 | 6 |
| ... | ... | ... |
| 8 | 4 | 2 |
| 9 | 3 | 0 |
| ... | ... | ... |
| M-1 | 20 | 15 |

TABLE 2

Storage Control Table

| Input Channel Number | Input Time-Slot Number | | | | | | | | |
|---|---|---|---|---|---|---|---|---|---|
| | 0 | 1 | 2 | 3 | 4 | 5 | 6 | 7 | ... | M-1 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 1 | 0 | 0 | 0 | 0 |
| 3 | 1 | 0 | 0 | 0 | 0 | 1 | 0 | 0 | 0 | 0 |
| 4 | 0 | 0 | 1 | 0 | 0 | 0 | 0 | 0 | 0 | 0 |
| 5 | 1 | 0 | 0 | 0 | 0 | 0 | 0 | 0 | 0 | 0 |
| 6 | 0 | 0 | 1 | 0 | 0 | 0 | 0 | 0 | 0 | 0 |
| ... | 0 | 0 | 0 | 0 | 0 | 0 | 0 | 0 | 0 | 0 |
| N-1 | 0 | 0 | 0 | 0 | 0 | 0 | 0 | 0 | 0 | 0 |

Generally, the cross configuration table is arranged according to the sequence of the output channels and the output time slots, which means that the data of an output channel and an output time slot comes from a corresponding input channel and input time slot. However, the storage control table is arranged according to the sequence of the input channels and the input time slots, which means that for an input channel and an input time slot, whether the data of the input channel and the input time slot needs to be saved is determined as follows: 1 represents that the data needs to be saved and 0 represents that the data does not need to be saved. Therefore, the generation of the storage control table from the cross configuration table is actually an inverted operation on the cross configuration table.

The content of the storage control table output to each data storage module according to a time slot count is a write control signal of each data storage module. Each data storage module buffers the input data into the FIFO when the write control is valid (being 1).

The output control module obtains the data from the N data storage modules, performs time-slot adjustment, and outputs the data. After the data is buffered in the FIFO of a data storage module, the data can be obtained from the data storage module. However, since the data may be buffered in the FIFOs of multiple data storage modules at the same time (as the data from multiple input channels may be sent to the same output channel at a moment), a read sequence needs to be arranged, that is, an arbiter is needed. When a CPU configures the CM for the first time or changes the configuration of the CM, the arbiter starts working to generate and save an arbitration selection table. The arbitration selection table includes the input channel that the data to be obtained comes from and the time slot where the data is output corresponding to each input time slot, as shown in Table 3.

TABLE 3

Arbitration Selection Table

| | Input Time-Slot Number | | | | | | | | |
|---|---|---|---|---|---|---|---|---|---|
| | 0 | 1 | 2 | 3 | 4 | 5 | 6 | ... | M-1 |
| Input Channel Number | 3 | 5 | 4 | 6 | 7 | 3 | 2 | ... | 20 |
| Output Time-Slot Number | 9 | 0 | 8 | 2 | 4 | 1 | 5 | ... | 7 |

The data is obtained from the N data storage modules according to the input channel number in the arbitration selection table, and the location of the buffer in the output control module where the data is written is controlled according to the output time-slot number in the table.

The design of the arbiter may adopt an arbitration mechanism with a priority. The principle is: (1) perform a priority classification on the data storage modules: if the data of over M/4 time slots of the output channel j comes from the input channel i, the priority of the data storage module (i, j) is 1 (1 represents a high priority); otherwise, the priority is 0; (2) if the FIFOs of the N data storage modules are all empty, data reading is not performed; (3) if the FIFO of only one data storage module among the N data storage modules is not empty, this data storage module is read; and (4) if the FIFOs of more than one data storage modules among the N data storage modules are not empty, the channel numbers corresponding to all the data storage modules having a non-empty FIFO are recorded, and these data storage modules are read according to the channel numbers in an ascending order. The data storage modules, of which the priority is 1, are first accessed.

As for the arbitration mechanism, it should be noted that, when the FIFOs of more than one data storage modules are non-empty, the current situation must be recorded and the read/write sequence is arranged accordingly. In this manner, it is ensured that when the priorities of the data storage modules are the same, the access priority of the data storage module having a large channel number is not lower than that of the data storage module having a small channel number.

In addition, the arbitration mechanism is not fixed, but the selection of the arbitration mechanism may affect the depth of the FIFO in each data storage module. The arbitration mechanism without proper design leads to the problem that the overflow will not occur only when the FIFO in each data storage module is deep enough. It can be proved that when the above arbitration mechanism is adopted, the overflow will not occur even if the depth of the FIFO of each data storage module is M/4 (the minimum value in theory).

Figure 4:
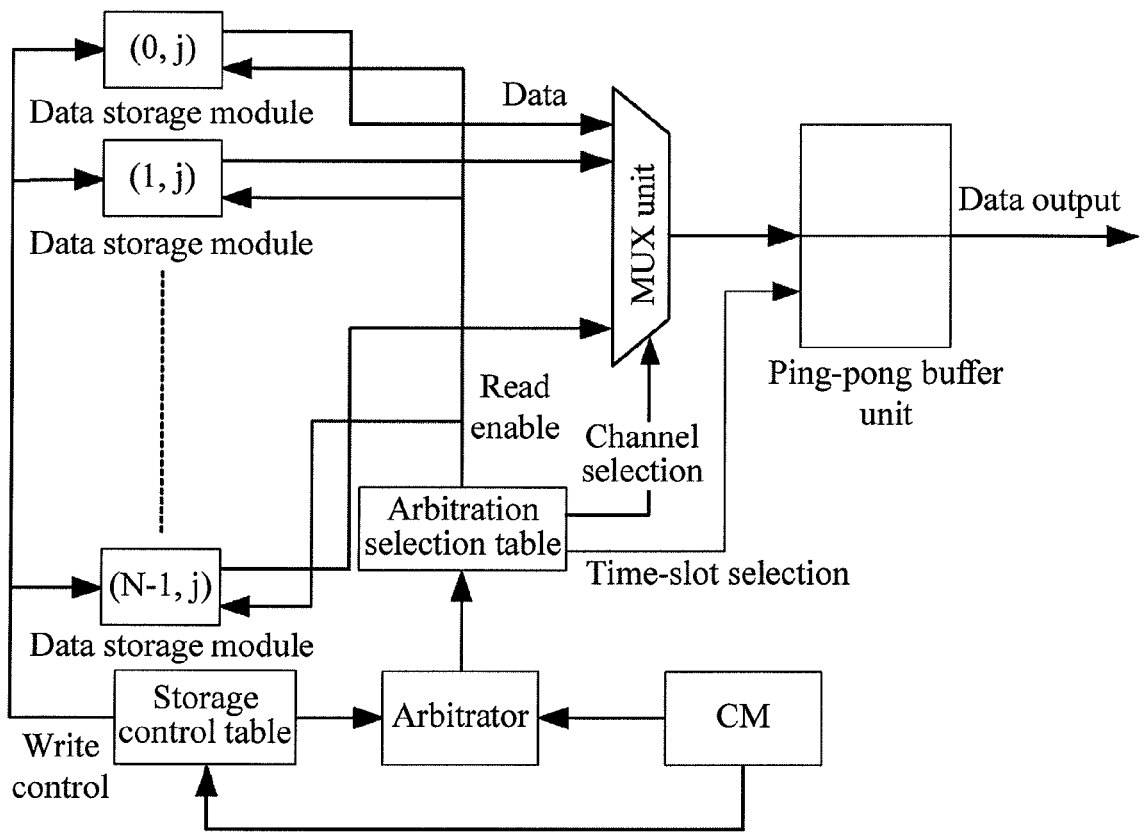
FIG. 4 is a schematic view of output control of an output channel j by using an MUX according to an embodiment of the present invention.

The data selected through arbitration is the data of each time slot of the output channel j. The data is written into the right location of the output buffer of the output control module according to the output time-slot number, and finally the data is read sequentially. To avoid that the reading of the data of a former frame is affected when the data of a current frame is stored, a ping-pong buffer is needed to buffer the data (the ping-pong buffer means that at least two packets of the maximum size are used for buffering when data packets are transmitted. When one packet is sent, the other packet is loaded. After the first packet is sent out, the second packet is sent immediately, and the rest may be deduced by analogy. In this way, back-to-back data packets can be sent to a line continuously). When the data of the current M time slots is buffered, the prepared data of the previous M time slots is output. FIG. 4 is a schematic view of output control of the output channel j by using an MUX according to an embodiment of the present invention. As shown in FIG. 4, the output control module includes: an MUX unit, configured to send service data in the multiple data storage modules in each time slot to the output channel of each output module according to the preset corresponding relation between the input channel numbers and the output time-slot numbers by using an MUX The output control module further includes a ping-pong buffer unit, which is located between the MUX unit and the output channel, and configured to write the data of the input channel number corresponding to each input time-slot number into the location of the corresponding output time-slot number for re-buffering through the ping-pong buffer.

Figure 5:
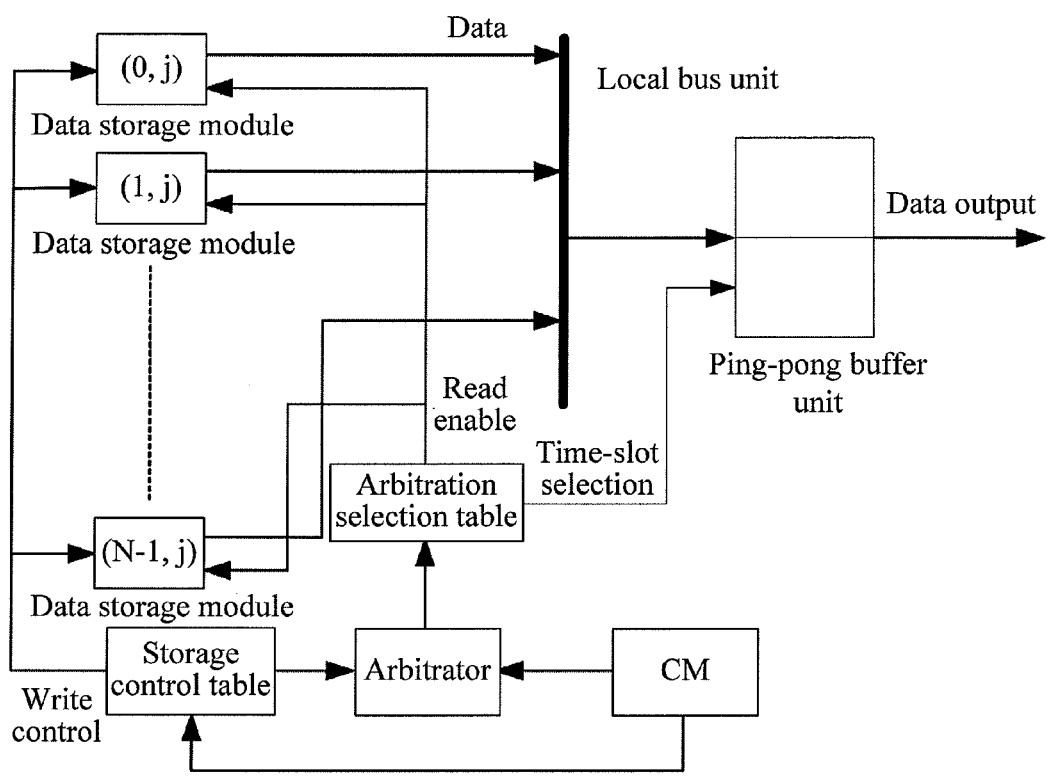
FIG. 5 is a schematic view of output control of an output channel j by using an internal bus according to an embodiment of the present invention.

The selecting the channel according to the arbitration selection table by using the MUX may also be implemented by using an internal bus. FIG. 5 is a schematic view of output control of the output channel j using an internal bus according to an embodiment of the present invention, which is characterized in that: for each data storage module, when no output is performed, an output signal is set at a high impedance state; and when the read enable is valid, a data drive is performed on the bus. The output control module is implemented through an internal bus unit, and the internal bus unit is configured to send the service data in the multiple data storage modules in each time slot to the output channel of each output module according to the preset corresponding relation between the input channel numbers and the output time-slot numbers by using the internal bus. The output control module further includes a ping-pong buffer unit, which is located between the internal bus unit and the output channel, and configured to write the data of the input channel number corresponding to each input time-slot number into the location of the corresponding output time-slot number for re-buffering through the ping-pong buffer.

For the output channel j, the data should be output from each time slot; and if no data is output at a certain beat, it is indicated that a multicast of a time slot of an input channel exists. In this case, data needs to be replicated from the buffer according to CM information.

The embodiment of the present invention provides a solution for controlling read/write, and the time-slot level cross is implemented through the data storage module with buffer capability and the output control module with buffer capability. The embodiment of the present invention takes the advantages and disadvantages of the RAM storage solution and MUX selection solution into consideration, and raises an implementing method that combines the advantages of both solutions, which not only avoids using too many on-chip RAMs, but also avoids using too many MUXs, so as to reduce the chip size to some extent while maintaining the same cross capacity, and further reduce the costs and power consumption of the chip as well as decrease the resources for implementing the full-T cross. In this way, a greater cross capacity of the chip is achieved under the same processing condition; or, the size and the power consumption of the chip are reduced under the same processing condition and the same cross capacity. Since the data storage modules are used for storing data, the corresponding data storage modules of some input channels that are not used can be closed, so as to decrease the power consumption as much as possible, and this capability is lacking in the prior art. In the embodiment of the present invention, the ping-pong buffer is adopted in the output control module; and when the data of the current M time slots is buffered, the prepared data of the previous M time slots is output, thus preventing the data storage of the current frame from affecting the read of the data of the previous frame. The above solution according to the embodiment of the present invention may be applied in the fields such as Synchronous Optical Network (SONET) and Optical Transport Network (OTN).

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a ROM, a RAM, a magnetic disk, or an optical disk.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the scope of the present invention.

What is claimed is:

1. A full-T cross apparatus, comprises:
an input module of a data buffer to sequentially receive service data at each input time slot from respective multiple input channels; and
multiple output modules of the data buffer, wherein:
each of the multiple output modules comprises an output control module and multiple data storage modules,
each of the multiple data storage modules in each of the multiple output modules is communicatively connected to a respective output channel,
the multiple data storage modules in each of the multiple output modules are configured to buffer the service data sequentially received at each input time slot from the respective multiple input channels, and
each of the multiple output modules sends the buffered service data in the multiple data storage modules to the respective output channel according to output time slot information,
the output control module is configured to store address information and the output time-slot information of the buffered service data in each of the multiple data storage modules in each of the multiple output modules, wherein the address information comprises storage addresses of the buffered service data in the multiple data storage modules; and the output control module is configured to send the buffered service data in the multiple data storage modules to the respective output channel according to the output time-slot information and the address information of the service data;

the storage addresses of the service data in the multiple data storage modules comprise input channel numbers, and the output time-slot information comprises output time-slot numbers;

the multiple data storage module is configured to buffer the received service data which are to be crossed to the respective output channels according to a preset storage control table; and the preset storage control table is generated according to a cross configuration table of each respective output channel according to configuration information of a Control Memory (CM) of a full-T cross; and the output control module is further configured to send the received service data buffered in the multiple data storage modules according to each output time slot to the respective output channel according to a preset corresponding relation between the input channel numbers and the output time-slot numbers which is saved in an arbitration selection table; and the arbitration selection table is generated according to the cross configuration table of each respective output channel in the configuration information of the CM of the full-T cross, or generated according to the storage control table and the cross configuration table of each respective output channel in the configuration information of the CM of the full-T cross.

2. The apparatus according to claim 1, wherein each of the multiple data storage module comprises a First In First Out data buffer (FIFO), configured to buffer the service data.

3. The apparatus according to claim 1, wherein the corresponding output control module comprises:

a Multiplexer (MUX) unit, configured to send the received service data buffered in the multiple data storage modules at each input time slot to the respective output channel of each output module according to the preset corresponding relation between the input channel numbers and the output time-slot numbers using the MUX; or an internal bus unit, configured to send the received service data buffered in the multiple data storage modules at each input time slot to the respective output channel of each output module according to the preset corresponding relation between the input channel numbers and the output time-slot numbers using the internal bus.

4. The apparatus according to claim 3, wherein the respective output control module further comprises:

a ping-pong buffer unit, configured to write the input channel number corresponding to each input time-slot number into a location of the corresponding output time-slot number for re-buffering through the ping-pong buffer.

5. A full-T cross method, comprising:

using multiple output modules of a data buffer, wherein each of the multiple output modules comprises an corresponding output control module and multiple data storage modules for a respective output channel, wherein the method comprising:

buffering sequentially received service data at each input time slot from each of the respective input channels, which received service data are to be crossed and to be sent to the corresponding output channels;

wherein the buffering comprising storing the service data sequentially received at each input time slot from each of the respective input channels into the multiple data storage modules for the corresponding output channel, each of the multiple data storage modules is communicatively connected to the corresponding output channel, writing an input channel number to correspond to the buffered service data of each input time-slot number into a location of a corresponding output time-slot number for re-buffering the service data in the corresponding output control module according to a preset corresponding relation between the input channel numbers and the output time-slot number; and outputting the re-buffered service data in the corresponding output control module to the corresponding output channel according to the output time-slot number, wherein the output control module is configured to store address information and the output time-slot information of the buffered service data in each of the multiple data storage modules in each of the multiple output modules, wherein the address information comprises storage addresses of the buffered service data in the multiple data storage modules; and the output control module is configured to send the buffered service data in the multiple data storage modules to the respective output channel according to the output time-slot information and the address information of the service data;

wherein the storage addresses of the service data in the multiple data storage modules comprise input channel numbers, and the output time-slot information comprises output time-slot numbers;

buffering, by the multiple data storage module is configured to buffer the received service data which are to be crossed to the respective output channels according to a preset storage control table; and the preset storage control table is generated according to a cross configuration table of each respective output channel according to configuration information of a Control Memory (CM) of a full-T cross; and sending, by the output control module is further configured to send the received service data buffered in the multiple data storage modules according to each output time slot to the respective output channel according to a preset corresponding relation between the input channel numbers and the output time-slot numbers which is saved in an arbitration selection table; and the arbitration selection table is generated according to the cross configuration table of each respective output channel in the configuration information of the CM of the full-T cross, or generated according to the storage control table and the cross configuration table of each respective output channel in the configuration information of the CM of the full-T cross.

6. The method according to claim 5, wherein the buffering of the service data from the respective input channels which are to be crossed to the corresponding output channels, comprising:

buffering the service data using a First In First Out data buffer (FIFO).

7. The method according to claim 5, wherein the writing of the service data of the input channel number to correspond to each input time-slot number from the buffered service data into the location of the corresponding output time-slot number for re-buffering according to the preset corresponding relation between the input channel numbers and the output time-slot numbers comprising:

writing the data of the input channel number corresponding to each input time-slot number from the buffered service data into the location of the corresponding output time-slot number for re-buffering according to the preset corresponding relation between the input channel numbers and the output time-slot numbers using a Multiplexer (MUX); or writing the service data of the input channel number corresponding to each input time-slot number from the buffered service data into the location of the corresponding output time-slot number for re-buffering according to the preset corresponding relation between the input channel numbers and the output time-slot numbers using an internal bus.

8. A non-transitory computer-readable medium having computer executable instructions for causing a computer to perform steps in a full-T apparatus comprising:

using multiple output modules of a data buffer, wherein each of the multiple output modules comprises a corresponding output control module and multiple data storage modules corresponding output channel, wherein the method comprising:

buffering sequentially received service data at each input time slot from each of the respective input channels, which received service data are to be crossed and to be sent to the corresponding output channels;

wherein the buffering comprising storing the service data sequentially received at each input time slot from each of the respective input channels into the multiple data storage modules for the corresponding output channel, each of the multiple data storage modules is communicatively connected to the corresponding output channel, writing an input channel number to correspond to the buffered service data of each input time-slot number into a location of a corresponding output time-slot number for re-buffering the service data in the corresponding output control module according to a preset corresponding relation between the input channel numbers and the output time-slot number; and outputting the re-buffered service data in the corresponding output control module to the corresponding output channel according to the output time-slot number, wherein the output control module is configured to store address information and the output time-slot information of the buffered service data in each of the multiple data storage modules in each of the multiple output modules, wherein the address information comprises storage addresses of the buffered service data in the multiple data storage modules; and the output control module is configured to send the buffered service data in the multiple data storage modules to the respective output channel according to the output time-slot information and the address information of the service data;

wherein the storage addresses of the service data in the multiple data storage modules comprise input channel numbers, and the output time-slot information comprises output time-slot numbers;

buffering, by the multiple data storage module is configured to buffer the received service data which are to be crossed to the respective output channels according to a preset storage control table; and the preset storage control table is generated according to a cross configuration table of each respective output channel according to configuration information of a Control Memory (CM) of a full-T cross; and sending, by the output control module is further configured to send the received service data buffered in the multiple data storage modules according to each output time slot to the respective output channel according to a preset corresponding relation between the input channel numbers and the output time-slot numbers which is saved in an arbitration selection table; and the arbitration selection table is generated according to the cross configuration table of each respective output channel in the configuration information of the CM of the full-T cross, or generated according to the storage control table and the cross configuration table of each respective output channel in the configuration information of the CM of the full-T cross.

* * * * *